United States Patent
Stelle, IV (10) Patent No.: US 12,068,522 B2
(45) Date of Patent: Aug. 20, 2024

(54) MAGNETIC DETECTION OF MOVEABLE ARM POSITION FOR GNSS ANTENNAS IN AN ANTENNA ALIGNMENT DEVICE

(71) Applicant: VIAVI SOLUTIONS INC., San Jose, CA (US)

(72) Inventor: Raleigh Benton Stelle, IV, Indianapolis, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 48 days.

(21) Appl. No.: 17/658,294

(22) Filed: Apr. 7, 2022

(65) Prior Publication Data
US 2023/0327315 A1    Oct. 12, 2023

(51) Int. Cl.
| | |
|---|---|
| *H01Q 1/08* | (2006.01) |
| *G01D 5/14* | (2006.01) |
| *G01S 19/14* | (2010.01) |
| *G01S 19/35* | (2010.01) |
| *H01Q 1/12* | (2006.01) |

(52) U.S. Cl.
CPC ............... *H01Q 1/084* (2013.01); *G01D 5/14* (2013.01); *H01Q 1/125* (2013.01); *G01S 19/14* (2013.01); *G01S 19/35* (2013.01)

(58) Field of Classification Search
CPC .......... H01Q 1/27; H01Q 1/273; H01Q 1/125; H01Q 1/084; H01Q 1/08; G01S 19/14
USPC ................................. 343/882, 765, 890, 702
See application file for complete search history.

(56) References Cited

U.S. PATENT DOCUMENTS

| | | | | |
|---|---|---|---|---|
| 3,934,216 | A * | 1/1976 | Ward ................. | B60K 37/06 310/46 |
| 6,897,828 | B2 * | 5/2005 | Boucher ............. | H01Q 1/246 343/890 |
| 8,436,779 | B2 * | 5/2013 | Clifford ............. | H01Q 1/125 343/765 |
| 8,760,153 | B2 * | 6/2014 | Parakka ............. | G01B 7/30 324/207.25 |
| 10,557,723 | B2 * | 2/2020 | Lee ................... | G01D 5/145 |
| 10,677,934 | B2 * | 6/2020 | Vella-Coleiro ..... | G01S 19/55 |
| 2009/0322647 | A1 * | 12/2009 | Shawver ........... | H01Q 1/2216 343/882 |
| 2011/0225804 | A1 * | 9/2011 | Clifford ............ | H01Q 1/1207 269/55 |

(Continued)

OTHER PUBLICATIONS

MultiWave Sensors (Smart Aligner Users Guide V1.1, Jan. 2015. pp. 1-34. (Year: 2015).*

*Primary Examiner* — Bo Fan
(74) *Attorney, Agent, or Firm* — DLA Piper LLP (US)

(57) ABSTRACT

An antenna alignment device may include multiple GNSS antennas, locations and or relative orientations of which may be detected using magnetometers. The GNSS antennas may be mounted on moveable arms (e.g., at far ends of the moveable arms). Multiple magnetometers may be provided at the base of each of the moveable arms. The magnetometers may detect positions of embedded metallic objects at the bases of the corresponding moveable arms thereby determining a position of the moveable arms and the GNSS antennas mounted thereon. A processor may use the detected positions of the GNSS antennas for calculating, among other things, the azimuth of an external antenna to which the antenna alignment device is attached.

20 Claims, 5 Drawing Sheets

(56) References Cited

U.S. PATENT DOCUMENTS

| | | | | |
|---|---|---|---|---|
| 2014/0049444 A1* | 2/2014 | Williams | ............... | H01Q 3/06 |
| | | | | 343/882 |
| 2014/0266925 A1* | 9/2014 | Dalmazzo | ............... | G01S 19/14 |
| | | | | 343/702 |
| 2015/0054681 A1* | 2/2015 | Clifford | ............... | G01S 19/53 |
| | | | | 29/601 |
| 2016/0305795 A1* | 10/2016 | Eisenbeis | ............... | G01D 7/007 |

* cited by examiner

FIG. 4

MAGNETIC DETECTION OF MOVEABLE ARM POSITION FOR GNSS ANTENNAS IN AN ANTENNA ALIGNMENT DEVICE

BACKGROUND

Modern communication systems rely heavily on wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and or other aspects associated with electromagnetic fields and electromagnetic radiation. Antenna alignment may therefore be desired for optimizing bandwidth, signal strength, and or other transmit/receive parameters. Antenna alignment may generally be performed using antenna alignment devices.

Global Navigation Satellite System (GNSS) technology has been used in antenna alignment devices. Particularly, multiple GNSS antennas have been used to calculate corresponding multiple geolocations. The multiple geolocations may be used to calculate the azimuth of the antenna alignment device and hence the azimuth of the antenna itself. The azimuth calculation and or any other calculations based on the GNSS antennas are predicated on knowing the positions and relative orientation of the GNSS antennas (the GNSS antennas in the antenna alignment devices are not to be confused with an external antenna, e.g., a cellular antenna, being aligned). A conventional method of detecting these positions relies on optics, e.g., whether a particular position blocks an incident light. This method is cumbersome and requires extra equipment to generate light and detect any blocking thereof. Mechanical sensors (e.g., pressure sensors) also have been used to detect the positions. These mechanical sensors are prone to wear and tear, subject to corrosion, and therefore likely to fail. These and other conventional solutions therefore have been found to be less than optimal.

As such, a significant improvement upon the technology of detecting positions of different GNSS antennas in antenna alignment devices is desired.

SUMMARY

Embodiments disclosed herein may solve the aforementioned technical problems and provide other solutions as well. An example antenna alignment device may include multiple GNSS antennas, locations and or relative orientations of which may be detected using magnetometers. In particular, the GNSS antennas may be mounted on moveable arms (e.g., at far ends of the moveable arms). Multiple magnetometers may be provided at the base of each of the moveable arms. The magnetometers may detect positions of embedded metallic objects at the bases of the corresponding moveable arms thereby determining a position of the moveable arms and the GNSS antennas mounted thereon. A processor may use the detected positions of the GNSS antennas for calculating the azimuth of an external antenna (e.g., a cellular antenna) to which the antenna alignment device is attached.

In an embodiment, an antenna alignment device is provided. The antenna alignment device is configured to be attached to an external antenna. The antenna alignment device may include a first global navigation satellite system (GNSS) receiver mounted on a first arm configured to be independently adjusted to a first set of positions and a second GNSS receiver mounted on a second arm configured to be independently adjusted to a second set of positions. The antenna alignment device may further include a first set of magnetometers configured to detect a first position of the first arm within the first set of positions and a second set of magnetometers configured to detect a second position of the second arm within the second set of positions. The antenna alignment device may additionally include a processor configured to use the detected first position of the first arm and the second position of the second arm to calculate an alignment parameter for the external antenna.

In another embodiment, a system is provided. The system may include a first GNSS antenna mounted on a first arm configured to be independently adjusted to a first set of positions and a second GNSS antenna mounted on a second arm configured to be independently adjusted to a second set of positions. The system may further include a first set of magnetometers configured to detect a first position of the first arm within the first set of positions and a second set of magnetometers configured to detect a second position of the second arm within the second set of positions. The system may additionally include a processor configured to use the detected first position of the first arm and the second position of the second arm to calculate an alignment parameter for an external antenna.

In yet another embodiment, a method is provided. The method may include detecting, by a first set of magnetometers, a first position of a first arm of an antenna alignment device, wherein the first position is within a first set of positions, and a first global navigation satellite system (GNSS) antenna is mounted on the first arm. The method may further include detecting, by a second set of magnetometers, a second position of a second arm of the antenna alignment device, wherein the second position is within a second set of positions, and a second GNSS antenna is mounted on the second arm. The method may additionally include calculating, by a processor, an alignment parameter of an external antenna attached to the antenna alignment device using the detected first position of the first arm and the detected second position of the second arm.

It should be understood that these drawings are merely for explaining example embodiments and therefore are not limiting.

DETAILED DESCRIPTION OF SEVERAL EMBODIMENTS

It is desirable to know the positions and or relative orientations of GNSS antennas for an antenna alignment device that performs GNSS based antenna alignment calculations (an external antenna being aligned is not to be confused with the GNSS antennas in the antenna alignment device). The GNSS antennas may generally be mounted on moveable arms, which may be configured to move across multiple positions (e.g., discrete positions). Magnetometers on the base of the moveable arms may be used to track positions of metallic objects embedded on the moveable arms. For example, a set of magnetometers may be provided along the base of a moveable arm where each magnetometer may correspond to a discrete arm position. When the arm is moved, an embedded metallic object may come in close proximity to a magnetometer corresponding to the discrete arm position. This proximity may cause the magnetic field to be detected by the magnetometer to allow it to locate the embedded metallic object. The location detection by the magnetometer may then be captured by a processor in the antenna alignment device to determine the location and or relative orientation of a GNSS antenna on the moveable arm.

Figure 1:
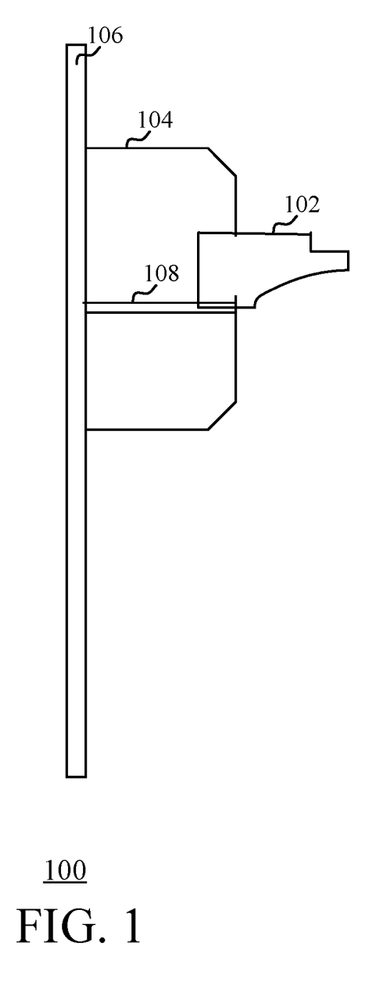
FIG. 1 shows an example antenna alignment environment based on the principles disclosed herein.

FIG. 1 shows an example antenna alignment (also referred to as antenna tuning) environment 100 based on the principles disclosed herein. The example environment 100 includes an antenna 104 (also referred to as an external antenna 104), which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, loop antenna, Yagi-type antenna, and or any type of antenna that may have to be aligned for optimal performance. Although the antenna 104 is described herein as a singular antenna, a combination of antennas that may have to be aligned should also be considered within the scope of this disclosure. The antenna 104 may use any kind of transmit/receive frequency, e.g., the antenna 104 may be a microwave antenna.

An antenna alignment device 102 may be attached to the antenna 104 using a coupler 108. The antenna alignment device 102 may include any type of sensors, displays, and/or other components configured to align (or tune) the antenna 104. When coupled to the antenna 104, the orientation of the antenna alignment device 102 may correspond to the orientation of the antenna 104. The alignment may be based on alignment parameters such as roll, pitch, or azimuth, as understood in the art.

In operation, the antenna alignment device 102 may use multiple GNSS antennas, each of which may use GNSS satellites to geolocate itself. The geolocation may be used for calculating latitude, longitude, and altitude of the corresponding GNSS antenna. Based on the calculated latitudes, longitudes, and the altitudes, the azimuth of the antenna 104 may be determined (e.g., based on a determined azimuth the antenna alignment device 102). The GNSS antennas may be placed on movable arms (as detailed below in the description corresponding to FIG. 2A), and the position of the movable arms may be required to calculate the azimuth (an example of an antenna alignment parameter) of the antenna 104. As further described below, magnetic sensors such as magnetometers may be used to determine the position of the arms containing the GNSS antennas.

Figure 2A:
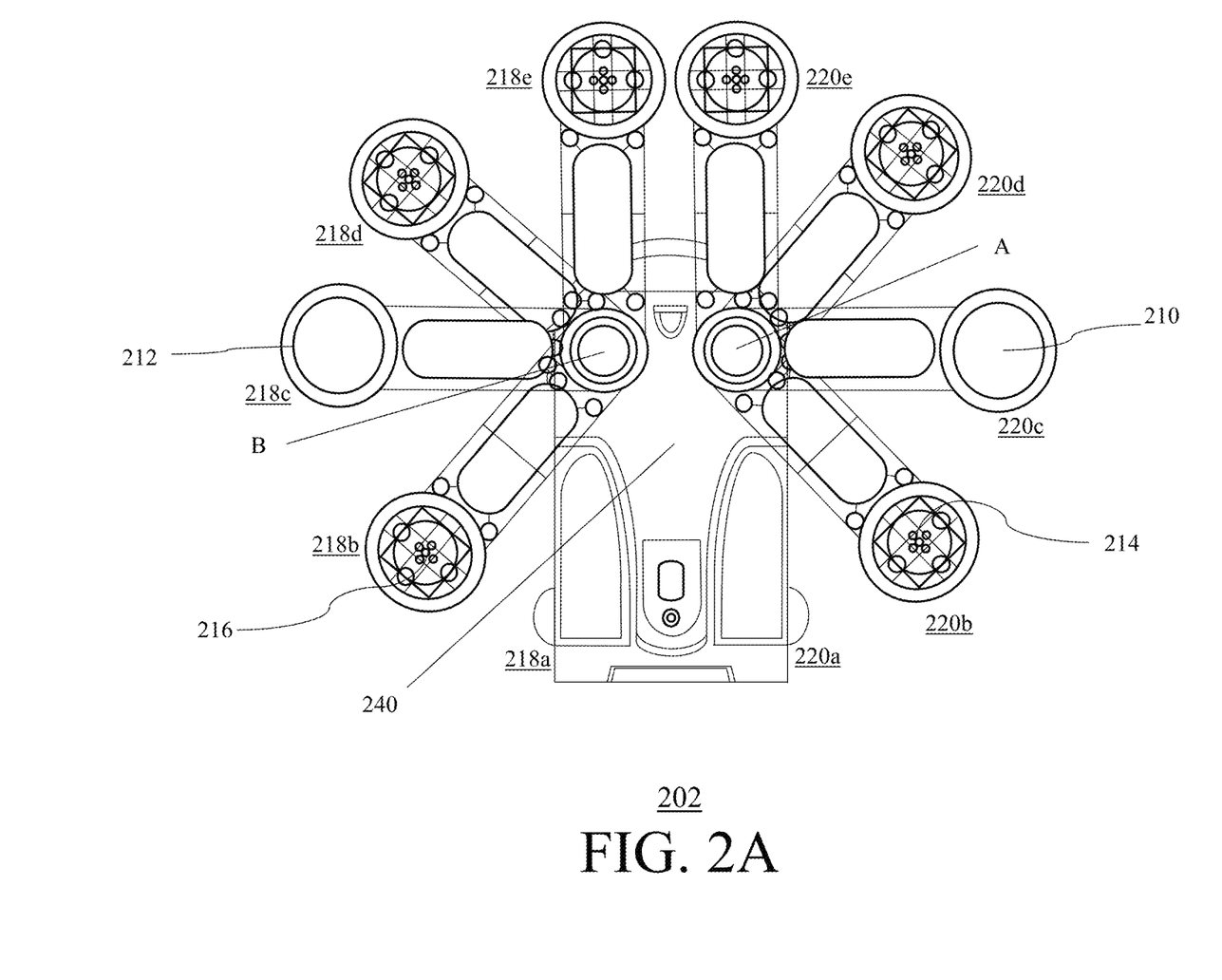
FIG. 2A shows an example antenna alignment device with movable arms containing GNSS antennas based on the principles disclosed herein.

FIG. 2A shows an example antenna alignment device 202 with movable arms containing GNSS antennas based on the principles disclosed herein. It should be understood that the shown configuration is merely an example, and antenna alignment devices with alternate configurations (e.g., containing less components or more components) should be considered within the scope of this disclosure.

As shown in FIG. 2A, the antenna alignment device 202 may include two movable arms 210, 212 rotatably connected to a housing 240 of the device 202 at points A and B, respectively. Within the first movable arm 210, there may be a first GNSS antenna 214 and within the second movable arm 212, there may be a second GNSS antenna 216. The first movable arm 210 may be moved to one of the multiple positions 220a-220e shown in the illustrated example, which may be discrete positions. The first position 220a may a stowing position for the first movable arm 210. The second movable arm 212 may be moved to one of the multiple positions 218a-218e shown in the illustrated example, which may be discrete positions. The first position 218a may be a stowing position for the second movable arm 212. Each of the moveable arms 210, 212 may be independently adjusted. The position of the arms 210, 212 may be detected by magnetometers (and or any other type of magnetic sensors). For instance, there may be four magnetometers for four of the five positions 220a-220e shown in the illustrated example (and analogously for four of the five positions 218a-218e) and the fifth position may be detected based on none of the corresponding magnetometers detecting the position of the corresponding arm 210 or 212. In some embodiments, each of the arm positions may be associated with a magnetometer. The data measured by the magnetometer may establish the positions and the relative orientations of the GNSS antennas 214, 216.

In some embodiments a GNSS receiver (not shown) may be provided on the housing 240 of the antenna alignment device in addition to the GNSS antennas 214, 216. The GNSS receiver may be a single dual channel receiver, the GNSS antennas 214, 216 may correspond to each of the channels. Using the GNSS antennas 214, 216 may allow for a smaller physical form factor because each of the GNSS antennas 214, 216 may just need a single radio frequency (RF) cable in the corresponding arms 210, 212. In some embodiments, GNSS receivers may be used in the arms 210, 212 instead of GNSS antennas 214, 216. Therefore, different kinds of antenna alignment devices with either GNSS antennas or GNSS receivers at the moveable arms should be considered within the scope of this disclosure.

Figure 2B:
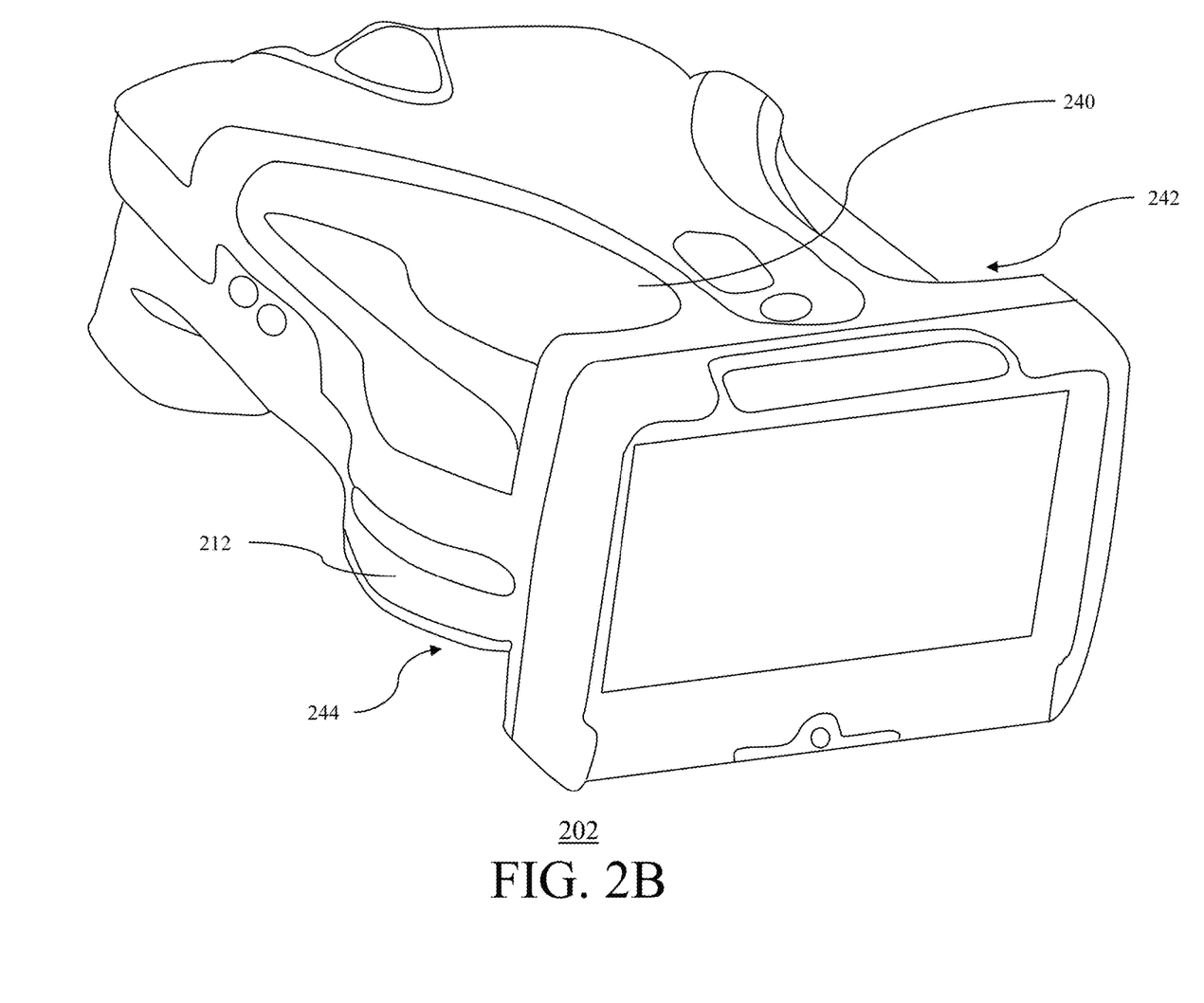
FIG. 2B shows a perspective view of the antenna alignment device of FIG. 2A with the movable arms in stowed positions.

FIG. 2B shows a perspective view of the antenna alignment device 202 with the movable arms 210 (obscured), 212 (shown) in stowed positions. In the illustrated example, the arms 210, 212 are respectively received within a receiving area 242, 244 of the housing 240.

Figure 3:
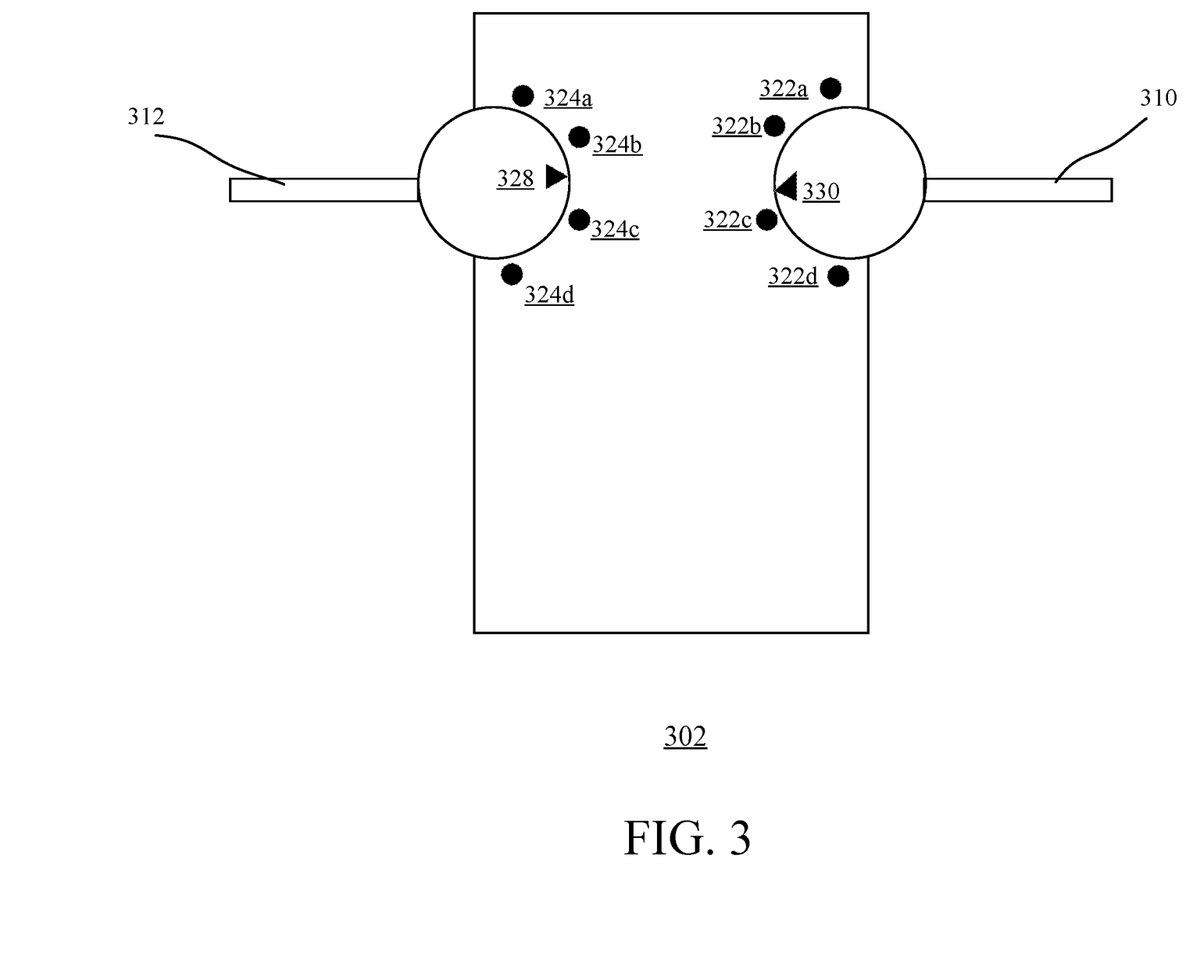
FIG. 3 shows a schematic view of an antenna alignment device based on the principles disclosed herein.

FIG. 3 shows a schematic view of an antenna alignment device 302 based on the principles disclosed herein. It should be understood that the schematic view shown in FIG. 3 and described herein is merely an example, and other types of antenna alignment devices with other types of schematics should also be considered within the scope of this disclosure.

As shown, there may be two moveable arms 310, 312 on the antenna alignment device 302. Each of the moveable arms 310, 312 may have a metallic object embedded thereon—the first moveable arm 310 has a first metallic object 330 and the second moveable arm 312 has a second metallic object 328. The metallic objects 328, 330 should be understood to include any kind of ferrous metal object, such as a metal screw or metal insert.

Around the corresponding bases of the moveable arms 310, 312, there may be multiple magnetometers, which may take a relatively small mechanical space and also be less likely to be affected by environmental factors. As shown, there are a first set of magnetometers 322a-322d around the base of the first moveable arm 310 and there are a second set of magnetometers 324a-324d around the base of the second moveable arm 312. Each of the magnetometers 322a-322d may detect the metallic object 330 when sufficiently close to it, disturbing the corresponding magnetic field. That is, based on detecting the corresponding position of the metallic object 330, the magnetometers 322a-322d may detect the position of the moveable arm 310. Similarly, based on detecting the corresponding position of the second metallic object 328, the second set of magnetometers 324a-324d may detect the position of the second moveable arm 312. As the GNSS antennas are attached to the moveable arms 310, 312 (as shown with reference to FIG. 2A above), the magnetometers 322a-322d and 324a-324d may detect the positions of the respective GNSS antennas. The positions of the GNSS antennas may be expressed in terms of the distance between the GNSS antennas and or angle between the GNSS antennas. In some embodiments, the magnetometers 322a-322d, 324a-324d may transmit a flag to a processor in the antenna alignment device 302 based on detecting the corresponding metallic object 330, 328. In other embodiments, each of the magnetometers 322a-322d, 324a-324d may transmit to the processor data indicating the distortion of the magnetic field and the processor may determine the position of the moveable arms 312, 310 based on the received data. The processor may determine the location and or relative orientations of the GNSS antennas for calculating e.g., an azimuth of an external antenna that the antenna alignment device 302 is attached to.

Figure 4:
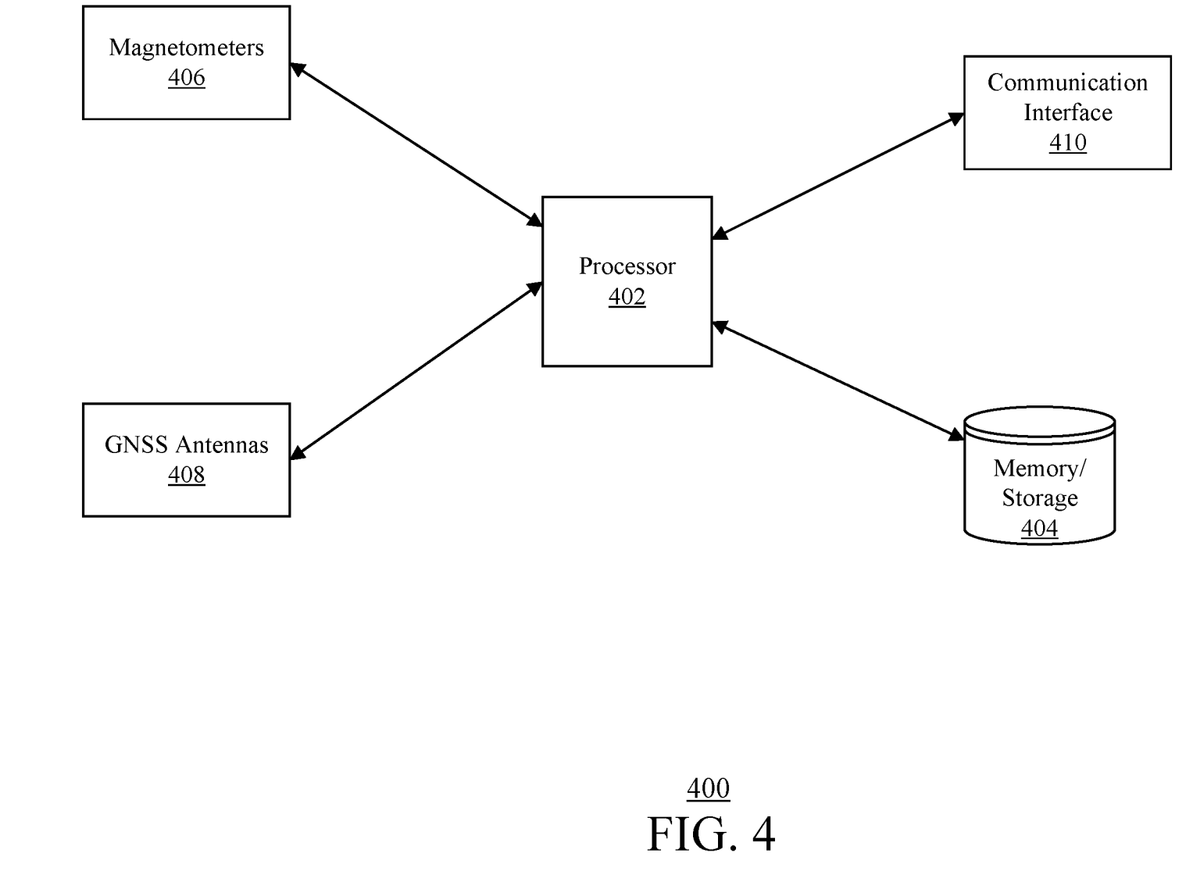
FIG. 4 shows an example architecture of an antenna alignment device based on the principles disclosed herein.

FIG. 4 shows an example architecture 400 of an antenna alignment device based on the principles disclosed herein. As shown, components in the architecture 400 may include, for example, a processor 402, a memory/storage device 404, magnetometers 406, GNSS antennas 408, and a communication interface 410. It should, however, be understood that these components are merely examples and architectures with additional, alternative, or fewer number of components should be considered within the scope of this disclosure. As described herein, the components forming the architecture 400 may be used by the antenna alignment device to detect the positions (and or relative orientations) of the GNSS antennas 408 and to calculate the azimuth of an external antenna that that antenna alignment device is attached to.

The processor 402 may include any kind of processing or control device that may command and control the several functionalities of the antenna alignment device. To that end, the processor 402 may execute instructions in the memory/storage device 404 to communicate with, provide instructions to, and receive data from the other components of the antenna alignment device. Some examples of the processor 402 may include a microprocessor, a system on a chip, an application specific integrated circuit (ASIC), a controller, or the like.

The memory/storage device 404 may include any kind of processor 402 readable storage medium. The memory/storage device 404 may store instructions for the processor 402 to execute and data gathered from the other components. The memory/storage device 404 should be understood to include any type of temporary or long-term storage. For instance, the memory/storage device 404 may include a random-access memory (RAM), a solid state drive, a hard drive, and or any other type of memory/storage technology.

The magnetometers 406 may include any kind of magnetic sensors that may measure the position of the moveable arms in the antenna alignment device. For example, the magnetometers 406 may detect a position of a metallic object within the base of a moveable arm. The detected position of the moveable arm may indicate a position of a corresponding GNSS antenna 408 within the moveable arm.

In some embodiments, one or more of the magnetometers 406 may transmit a flag (e.g., "1"=detection; "0"=non-detection) to the processor 402. In other embodiments, the magnetometers 406 may transmit corresponding measurements (of change in magnetic fields) to the processor 402, and the processor 402 may determine the detected positions of the moveable arms.

The GNSS antennas 408 may communicate with GNSS satellites to calculate the corresponding geolocations of the GNSS antennas 408. More particularly, the GNSS antennas 408 may receive GNSS signals broadcasted by the GNSS satellites, and use the attributes of the signal (e.g., time of the broadcast embedded in the GNSS signals) to geolocate themselves. Geolocating may include determining latitude, longitude, altitude, and/or other attributes associated with determining the corresponding geolocations. When multiple GNSS antennas 408 determine their geolocations, the processor 402 may use these geolocations to determine alignment parameters of the antenna alignment device (and consequently the external antenna), such as its azimuth. The azimuth calculation may be based on the exact locations—relative to each other—of the GNSS antennas 408, which may be provided by the measurements from the magnetometers 406.

The communication interface 410 may enable communication between the antenna alignment device and any type of processing device. For example, the communication interface 410 may enable a wireless communication using protocols such as Bluetooth, WiFi, Zigbee, etc. to communicate with a nearby processing device. An example of the nearby processing device may include a mobile device (e.g., smartphone, tablet) being used by the technician. The communication interface 410 may provide data to the mobile device such that one or more alignment parameters may be displayed by the mobile device. For example, the mobile device may provide an alternative to or replicate a display in the antenna alignment device. The communication interface 410 may further enable wired communication between the antenna alignment device and processing devices such as laptop computer and desktop computers. Using the wired communication, alignment parameters and other data may be transferred to the processing devices.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An antenna alignment device configured to be attached to an external antenna, the antenna alignment device comprising:
a first global navigation satellite system (GNSS) antenna mounted on a first arm configured to be independently adjusted to a first set of positions;
a second GNSS antenna mounted on a second arm configured to be independently adjusted to a second set of positions, the independent adjustments of the first arm and second arms in their corresponding non-stowed positions configured to vary a distance between the first and second GNSS antennas during deployment of the antenna alignment device;
a first set of magnetometers configured to detect a first position of the first arm within the first set of positions;
a second set of magnetometers configured to detect a second position of the second arm within the second set of positions; and
a processor configured to use the detected first position of the first arm and the second position of the second arm to calculate an alignment parameter for the external antenna.

2. The antenna alignment device of claim 1, wherein a number of the first set of magnetometers is one less than a number of the first set of positions.

3. The antenna alignment device of claim 2, wherein a number of the second set of magnetometers is one less than a number of the second set of positions.

4. The antenna alignment device of claim 1, wherein each of the first set of positions and the second set of positions includes a stowed position.

5. The antenna alignment device of claim 1, wherein the first arm includes a first embedded metallic object configured to be detected by one of the first set of magnetometers to detect the first position.

6. The antenna alignment device of claim 5, wherein the first GNSS antenna is mounted at a first end and the first embedded metallic object is located at a second and opposite end of the first arm.

7. The antenna alignment device of claim 5, wherein the second arm includes a second embedded metallic object configured to be detected by one of the second set of magnetometers to detect the second position.

8. The antenna alignment device of claim 7, wherein the second GNSS antenna is mounted at a first end and the second embedded metallic object is located at a second and opposite end of the second arm.

9. The antenna alignment device of claim 1, wherein the antenna alignment parameter comprises an azimuth of the antenna.

10. A system comprising:
a first global navigation satellite system (GNSS) receiver mounted on a first arm configured to be independently adjusted to a first set of positions;
a second GNSS receiver mounted on a second arm configured to be independently adjusted to a second set of positions, the independent adjustments of the first arm and second arms in their corresponding non-stowed positions configured to vary a distance between the first and second GNSS antennas;
a first set of magnetometers configured to detect a first position of the first arm within the first set of positions;
a second set of magnetometers configured to detect a second position of the second arm within the second set of positions; and
a processor configured to use the detected first position of the first arm and the second position of the second arm to calculate an alignment parameter for an external antenna.

11. The system of claim 10, wherein a number of the first set of magnetometers is one less than a number of the first set of positions.

12. The system of claim 11, wherein a number of the second set of magnetometers is one less than a number of the second set of positions.

13. The system of claim 10, wherein each of the first set of positions and the second set of positions includes a stowed position.

14. The system of claim 10, wherein the first arm includes a first embedded metallic object configured to be detected by one of the first set of magnetometers to detect the first position.

15. The system of claim 14, wherein the first GNSS receiver is mounted at a first end and the first embedded metallic object is located at a second and opposite end of the first arm.

16. The system of claim 14, wherein the second arm includes a second embedded metallic object configured to be detected by one of the second set of magnetometers to detect the second position.

17. The system of claim 16, wherein the second GNSS receiver is mounted at a first end and the second embedded metallic object is located at a second and opposite end of the second arm.

18. The system of claim 11, wherein the antenna alignment parameter comprises an azimuth of the external antenna.

19. A method comprising:
detecting, by a first set of magnetometers, a first non-stowed position of a first arm of an antenna alignment device, wherein the first non-stowed position is within a first set of non-stowed positions, and a first global navigation satellite system (GNSS) antenna is mounted on the first arm;
detecting, by a second set of magnetometers, a second non-stowed position of a second arm of the antenna alignment device, wherein the second non-stowed position is within a second set of non-stowed positions, and a second GNSS antenna is mounted on the second arm, the first and second sets of non-stowed positions allowing for a varied distance between the first and second GNSS antennas; and
calculating, by a processor, an alignment parameter of an external antenna attached to the antenna alignment device using the detected first position of the first arm and the detected second position of the second arm.

20. The method of claim 19, wherein the antenna alignment parameter comprises an azimuth of the external antenna.

* * * * *